(12) United States Patent
Luo

(10) Patent No.: US 8,331,331 B2
(45) Date of Patent: Dec. 11, 2012

(54) METHOD AND APPARATUS FOR DETERMINING CELL TIMING IN A WIRELESS COMMUNICATION SYSTEM

(75) Inventor: Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 794 days.

(21) Appl. No.: 12/182,300

(22) Filed: Jul. 30, 2008

(65) Prior Publication Data

US 2009/0046671 A1 Feb. 19, 2009

Related U.S. Application Data

(60) Provisional application No. 60/953,971, filed on Aug. 3, 2007.

(51) Int. Cl.
*H04W 56/00* (2009.01)
*H04J 3/06* (2006.01)
(52) U.S. Cl. .................. 370/336; 370/350; 370/503
(58) Field of Classification Search .................. None
See application file for complete search history.

(56) References Cited

U.S. PATENT DOCUMENTS

| | | | |
|---|---|---|---|
| 6,108,324 A | 8/2000 | Brown et al. | |
| 7,336,699 B2 | 2/2008 | Mathew et al. | |
| 7,369,534 B2 | 5/2008 | Amerga et al. | |
| 7,924,808 B2 * | 4/2011 | Han et al. | 370/350 |
| 8,050,225 B2 * | 11/2011 | Luo | 370/329 |
| 2008/0019350 A1 * | 1/2008 | Onggosanusi et al. | 370/350 |
| 2008/0095108 A1 * | 4/2008 | Malladi et al. | 370/329 |
| 2008/0181194 A1 * | 7/2008 | Lindoff et al. | 370/350 |
| 2008/0205375 A1 * | 8/2008 | Onggosanusi et al. | 370/350 |
| 2008/0273522 A1 * | 11/2008 | Luo et al. | 370/350 |
| 2008/0291892 A1 * | 11/2008 | Luo | 370/350 |
| 2009/0136037 A1 | 5/2009 | Haga et al. | |
| 2009/0257409 A1 * | 10/2009 | Chang et al. | 370/336 |
| 2010/0182979 A1 * | 7/2010 | Malladi et al. | 370/336 |
| 2011/0249598 A1 * | 10/2011 | Horvat et al. | 370/280 |

(Continued)

FOREIGN PATENT DOCUMENTS

CN 1486098 A 3/2004

(Continued)

OTHER PUBLICATIONS

Machine Translated Version of CN101009513 (which has a publication date of Aug. 1, 2007).*

(Continued)

*Primary Examiner* — Min Jung
(74) *Attorney, Agent, or Firm* — Kenneth Vu

(57) ABSTRACT

Techniques for determining the timing of a cell in a wireless communication system are described. A user equipment (UE) may obtain received samples that include at least one synchronization signal generated based on a cell identity (ID) of a cell. The UE may correlate the received samples with the at least one synchronization signal in the time domain at different time offsets to obtain energies for multiple timing hypotheses. The UE may identify at least one detected peak based on the energies for the multiple timing hypotheses. The UE may then update a set of candidate peaks based on the at least one detected peak and may identify a candidate peak with signal strength exceeding the signal strength of a peak being tracked. The UE may provide the timing of the identified candidate peak as the timing of the cell.

35 Claims, 9 Drawing Sheets

U.S. PATENT DOCUMENTS

2012/0087365 A1*  4/2012  Berggren .................. 370/350

FOREIGN PATENT DOCUMENTS

| CN | 101009513 A | 8/2007 |
|---|---|---|
| EP | 1906571 | 4/2008 |
| RU | 2189113 C2 | 9/2002 |
| RU | 2255427 C2 | 6/2005 |
| WO | WO9828931 | 7/1998 |
| WO | WO0130003 A1 | 4/2001 |
| WO | 2007020710 | 2/2007 |

OTHER PUBLICATIONS

Machine Translated Version of CN1486098 (which has a publication date of Mar. 31, 2004).*

International Search Report, PCT/US08/071997, International Search Authority, European Patent Office, Nov. 27, 2008.

Written Opinion, PCT/US08/071997, International Search Authority, European Patent Office, Nov. 27, 2011.

Ericsson, "Secondary Synchronization Signal Design," 3GPP TSG-RAN WG 1 #48-BIS, R1-071584, Mar. 26-30, 2007, MALTA, pp. 1-7, Internet Reference, XP002503944.

QUALCOMM Europe, "Details on PSC sequence design," 3GPP TSG-RAN WG 1 #49, R1-072009, May 7-11, 2007, Kobe, Japan, pages 1-11, Internet Reference, XP002503945.

3GPP, "3rd Generation Partnership Project; Technical Specification Group Radio Access Network; Physical Channels and Modulation (Release 8)," 3GPP TS 36.211 V 1.2.0, Jun. 2007, pp. 1-43, 3GPP, Sophia Antipolis Valbonne, France, XP002503943.

EE624 Mobile Communications Systems (MCS) in: CDMA Standards, Communication Networks Research Lab, (Fall 2000).

\* cited by examiner

METHOD AND APPARATUS FOR DETERMINING CELL TIMING IN A WIRELESS COMMUNICATION SYSTEM

The present application claims priority to provisional U.S. Application Ser. No. 60/953,971, entitled "TIMING SEARCH METHOD FOR E-UTRAN," filed Aug. 3, 2007, assigned to the assignee hereof and incorporated herein by reference.

BACKGROUND

I. Field

The present disclosure relates generally to communication, and more specifically to techniques for determining the timing of a cell in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of cells that can support communication for a number of user equipments (UEs). A UE may receive a transmission from a cell. The transmission may travel via one or more signal paths, which may include a direct signal path from the cell to the UE as well as reflected signal paths formed by various structures in the environment. Different signal paths typically have different channel gains and propagation delays. The channel gain and/or delay of each signal path may change due to various factors such as mobility of the UE, changes in the environment, etc. Furthermore, new signal paths may be formed and existing signal paths may vanish due to these factors. It may be desirable to determine the timing of the cell such that strong signal paths can be captured and the transmission from the cell can be reliably received.

SUMMARY

Techniques for determining the timing of a cell (e.g., a serving cell) in a wireless communication system are described herein. In an aspect, a UE may perform timing searches for a cell based on at least one synchronization signal generated based on a cell identity (ID) of the cell. The UE may obtain received samples comprising the at least one synchronization signal. The UE may have knowledge of the cell ID and can locally generate the at least one synchronization signal. The UE may correlate the received samples with the at least one locally generated synchronization signal in the time domain at different time offsets to obtain energies for multiple timing hypotheses within a search window. The UE may then determine the timing of the cell based on the energies for the multiple timing hypotheses.

In one design, the UE may identify at least one detected peak based on the energies for the multiple timing hypotheses. Each detected peak may correspond to a different timing hypothesis. The UE may update a set of candidate peaks based on the at least one detected peak. The UE may associate the at least one detected peak with the candidate peaks and may update the signal strength and timing of each candidate peak based on the signal strength and timing of an associated detected peak, if any. The UE may add each detected peak not associated with any candidate peak to the set of candidate peaks. The UE may also remove a candidate peak from the set of candidate peaks if at least one criterion is met.

The UE may identify a candidate peak with signal strength exceeding the signal strength of a peak being tracked. The UE may provide the timing of the identified candidate peak as the timing of the cell. The UE may update the timing of the cell with small timing adjustments determined based on a time tracking loop. The UE may update the timing of the cell with large timing adjustments determined based on the energies for the multiple timing hypotheses obtained from timing searches. The UE may update the placement of the search window whenever the timing of the cell is updated with a large timing adjustment.

Various aspects and features of the disclosure are described in further detail below.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). For clarity, certain aspects of the techniques are described below for LTE, and LTE terminology is used in much of the description below.

Figure 1:
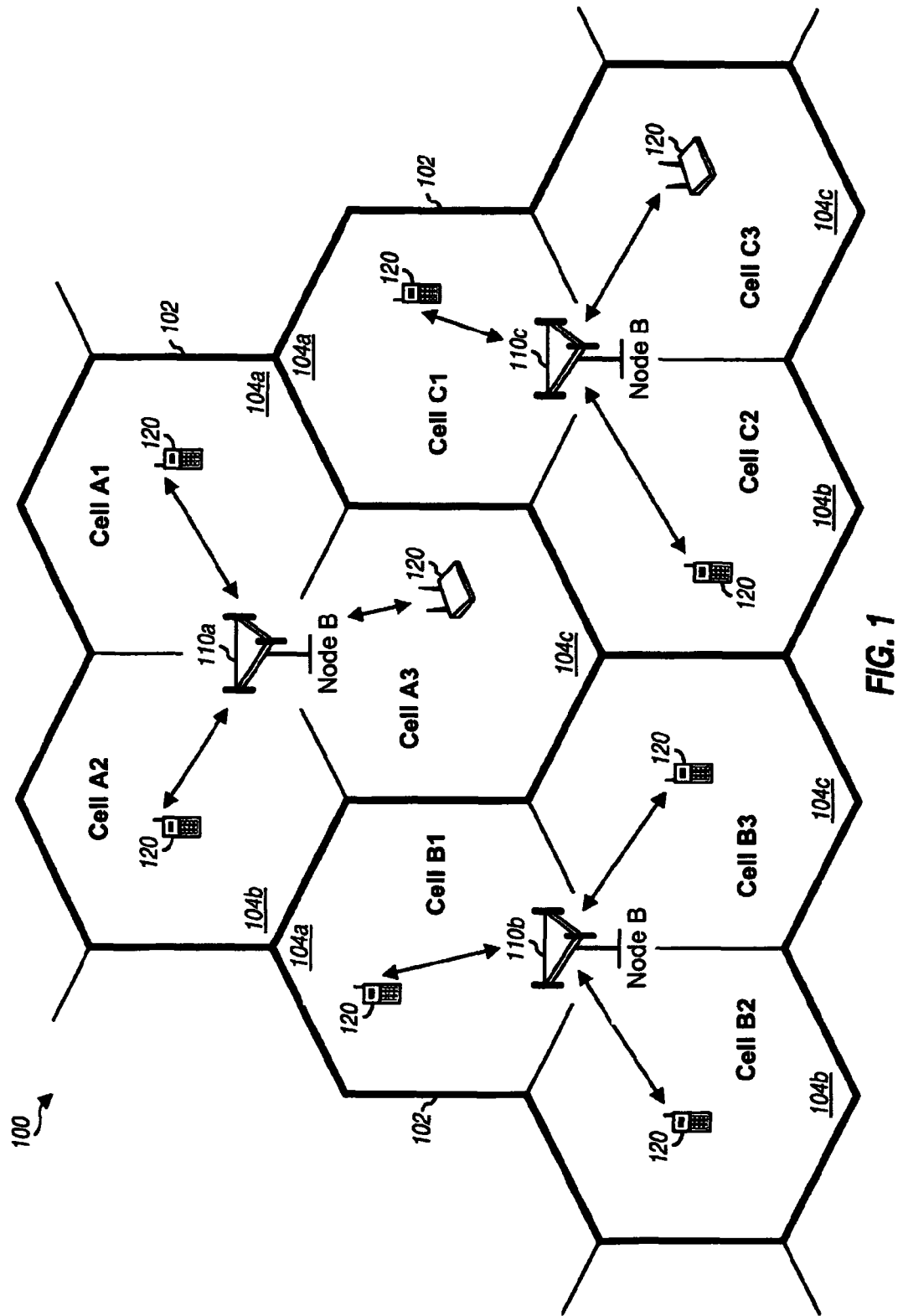
FIG. 1 shows a wireless communication system.

FIG. 1 shows a wireless communication system 100, which may be an LTE system. System 100 may include a number of Node Bs and other network entities. For simplicity, only three Node Bs 110a, 110b and 110c are shown in FIG. 1. A Node B may be a fixed station that communicates with the UEs and may also be referred to as an evolved Node B (eNB), a base station, an access point, etc. Each Node B 110 provides communication coverage for a particular geographic area 102. To improve system capacity, the overall coverage area of a Node B may be partitioned into multiple smaller areas, e.g., three smaller areas 104a, 104b and 104c. Each smaller area may be served by a respective Node B subsystem. In 3GPP, the term "cell" can refer to the smallest coverage area of a Node B and/or a Node B subsystem serving this coverage area. In 3GPP2, the term "sector" can refer to the smallest coverage area of a base station and/or a base station subsystem serving this coverage area. For clarity, 3GPP concept of cell is used in the description below.

In the example shown in FIG. 1, each Node B 110 has three cells that cover different geographic areas. For clarity, FIG. 1 shows the cells not overlapping one another. In a practical deployment, adjacent cells typically overlap one another at the edges, which may ensure that a UE can be within the coverage of one or more cells at any location as the UE moves about the system.

UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, etc. A UE may communicate with a Node B via the downlink and uplink. The downlink (or forward link) refers to the communication link from the Node B to the UE, and the uplink (or reverse link) refers to the communication link from the UE to the Node B.

In system 100, each Node B 110 may periodically transmit a primary synchronization signal and a secondary synchronization signal for each cell in that Node B. A primary synchronization signal may also be referred to as a primary synchronization channel (P-SCH). A secondary synchronization signal may also be referred to as a secondary synchronization channel (S-SCH). The primary and secondary synchronization signals may also be referred to by other names. The UEs may use the primary and secondary synchronization signals to detect for cells, to determine timing and frequency offset of detected cells, etc.

Figure 2:
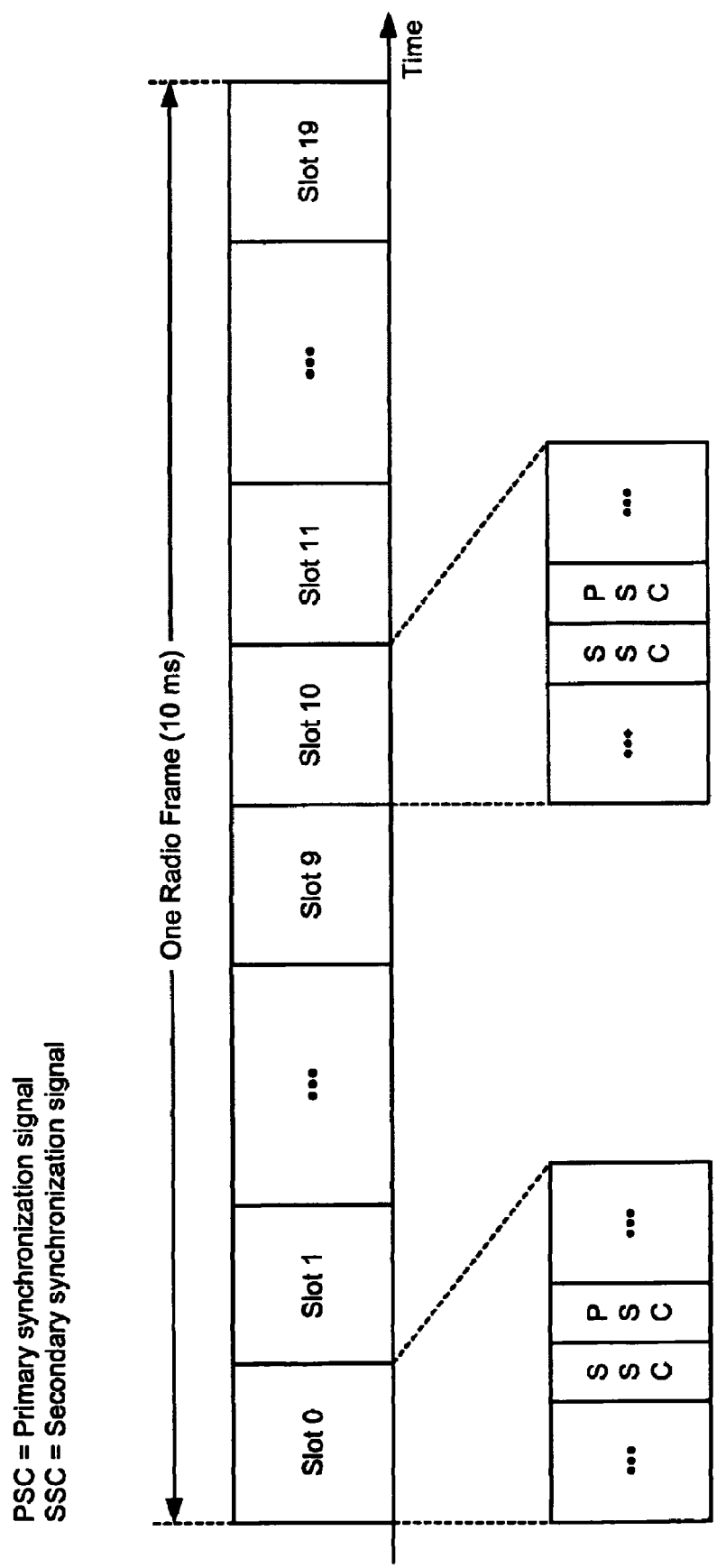
FIG. 2 shows transmission of primary and secondary synchronization signals.

FIG. 2 shows an example transmission of the primary and secondary synchronization signals for one cell. The transmission timeline for the downlink may be partitioned into units of radio frames. Each radio flame may have a predetermined duration (e.g., 10 milliseconds (ms)) and may be partitioned into 20 slots with indices of 0 through 19. Each slot may cover a fixed or configurable number of symbol periods, e.g., six or seven symbol periods. In the design shown in FIG. 2, the primary and secondary synchronization signals are sent in two symbol periods in each of slots 0 and 10 of each radio frame. In general, the primary and secondary synchronization signals may each be sent at any rate, e.g., any number of times in each radio frame. The secondary synchronization signal may be sent near (e.g., either immediately before or after) the primary synchronization signal, so that a channel estimate may be derived from the primary synchronization signal and used for coherent detection of the secondary synchronization signal.

Each cell may be assigned a cell ID that is unique among all cells within a certain range of that cell. This cell ID assignment scheme may allow each UE to uniquely identify all cells detected by that UE regardless of the UE location. The system may support a set of cell IDs. Each cell may be assigned a specific cell ID from the set of cell IDs supported by the system.

In one design, a set of 504 unique cell IDs may be supported by the system. The 504 cell IDs may be grouped into 168 unique cell ID groups, and each cell ID group may contain three unique cell IDs. The grouping may be such that each cell ID is included in only one cell ID group. A cell ID may be expressed as:

$$C_{ID} = 3 \cdot G_{ID} + N_{ID} \qquad \text{Eq (1)}$$

where
 $C_{ID} \in \{0, \ldots, 503\}$ is the cell ID,
 $G_{ID} \in \{0, \ldots, 167\}$ is an index of a cell ID group to which the cell ID belongs, and
 $N_{ID} \in \{0, 1, 2\}$ is an index of a specific ID within the cell ID group.

In the design shown in equation (1), a cell ID is uniquely defined by (i) a first number within a range of 0 to 167 and representing the cell ID group and (ii) a second number within a range of 0 to 2 and representing an ID within the cell ID group. In general, any number of cell IDs may be supported, the cell IDs may be grouped into any number of groups, and each group may include any number of cell IDs. For clarity, much of the description below is for the design described above with 504 total cell IDs, 168 cell ID groups, and 3 cell IDs in each group.

Three primary synchronization code (PSC) sequences may be defined for the three possible values of $N_{ID}$ for the three cell IDs in each group. In addition, 168 secondary synchronization code (SSC) sequences may be defined for the 168 possible values of $G_{ID}$ for the 168 possible cell ID groups. The PSC and SSC sequences may be generated in various manners.

In one design, a PSC sequence may be generated based on a Zadoff-Chu sequence, as follows:

$$d_{psc}(n) = \begin{cases} e^{-j\frac{\pi \cdot u \cdot n(n+1)}{63}} & \text{for } n = 0, 1, \ldots, 30 \\ e^{-j\frac{\pi \cdot u \cdot (n+1)(n+2)}{63}} & \text{for } n = 31, 32, \ldots, 61 \end{cases} \qquad \text{Eq (2)}$$

where u is a root index determined by $N_{ID}$, and
 $d_{psc}(n)$ is a PSC sequence, with n being a symbol index.

Different PSC sequences may be generated with different indices u for the Zadoff-Chu sequence, with u being determined by $N_{ID}$. For example, u may be equal to 25, 29 and 34 for $N_{ID}$ of 0, 1 and 2, respectively. In the design shown in equation (2), the PSC sequence includes only the $N_{ID}$ part (and not the $G_{ID}$ part) of the cell ID.

In one design, an SSC sequence may be generated based on a maximum length sequence (M-sequence), as follows:

$$d_{ssc}(2n) = \begin{cases} s_0(n) \cdot c_0(n) & \text{in slot 0} \\ s_1(n) \cdot c_0(n) & \text{in slot 10} \end{cases} \qquad \text{Eq (3a)}$$

for $n = 0, 1, \ldots, 30$, $$d_{ssc}(2n+1) = \begin{cases} s_1(n) \cdot c_1(n) \cdot z_0(n) & \text{in slot 0} \\ s_0(n) \cdot c_1(n) \cdot z_1(n) & \text{in slot 10} \end{cases} \qquad \text{Eq (3b)}$$

for $n = 0, 1, \ldots, 30$, where
- $s_0(n)$ and $s_1(n)$ are two cyclic shifts of the M-sequence and generated based on $G_{ID}$,
- $c_0(n)$ and $c_1(n)$ are two scrambling sequences generated based on $N_{ID}$,
- $z_0(n)$ and $z_1(n)$ are two scrambling sequences generated based on $G_{ID}$, and
- $d_{ssc}(n)$ is an SSC sequence.

In the design shown in equation set (3), two cyclic shifts of the M-sequence are interleaved and scrambled to generate an SSC sequence. The SSC sequence for slot 0 is generated in a different manner than the SSC sequence for slot 10. Different SSC sequences may be generated with different cyclic shifts of the M-sequence, with the cyclic shifts being determined by $G_{ID}$. The SSC sequences may also be scrambled with different scrambling sequences generated based on $N_{ID}$. In the design shown in equation set (3), the SSC sequence includes both the $G_{ID}$ and $N_{ID}$ parts of the cell ID and is thus unique for each cell detected by a UE.

Generation of the PSC and SSC sequences in LTE are described in 3GPP TS 36.211, entitled "Evolved Universal Terrestrial Radio Access (E-UTRA); Physical Channels and Modulation (Release 8)," which is publicly available. The PSC and SSC sequences may also be generated in other manners.

LTE utilizes orthogonal frequency division multiplexing (OFDM) on the downlink. OFDM partitions the system bandwidth into multiple (K) orthogonal subcarriers, which are also commonly referred to as tones, bins, etc. Each subcarrier may be modulated with data. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 MHz, respectively.

Figure 3:
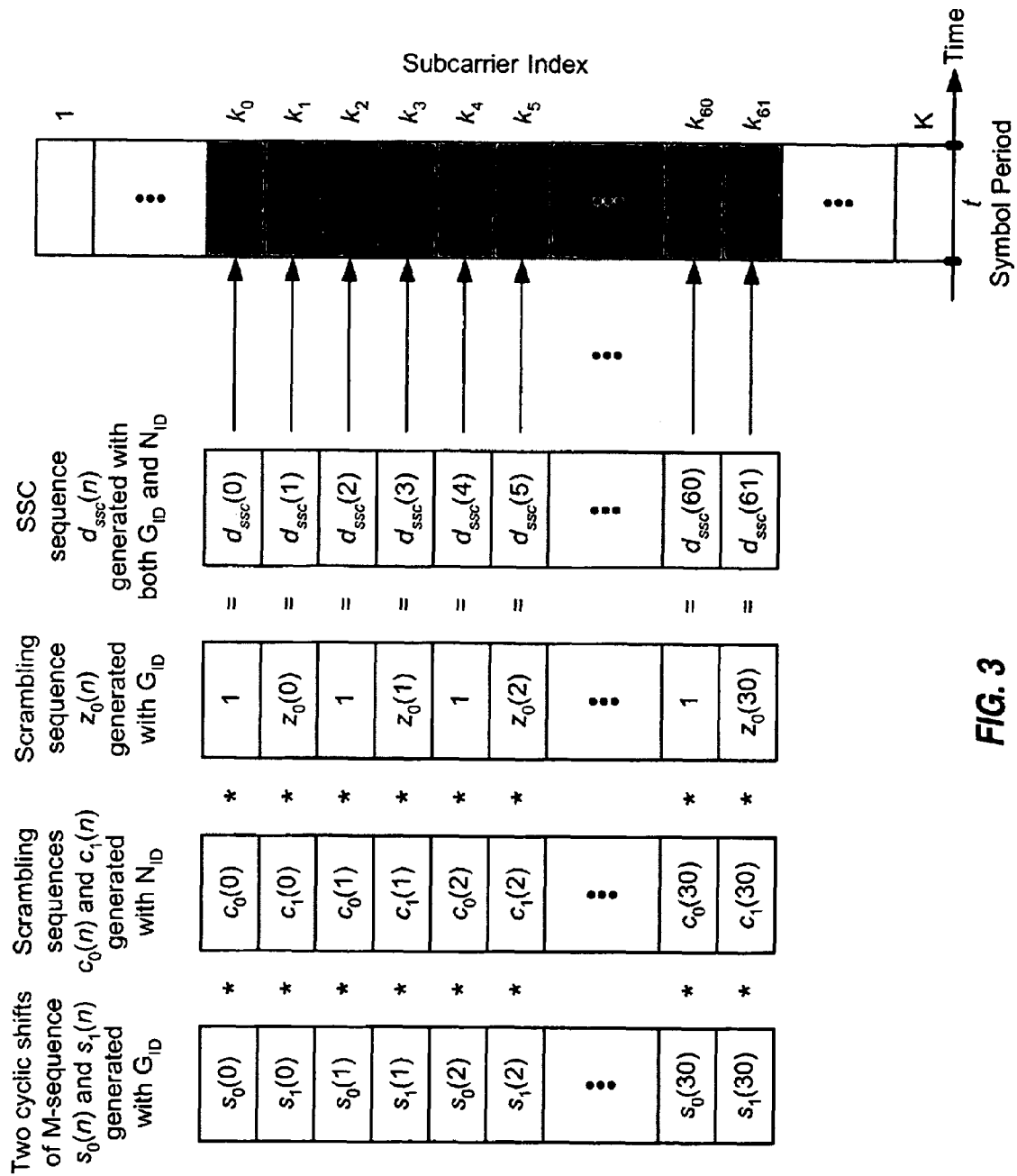
FIG. 3 shows generation of a secondary synchronization signal for a cell.

FIG. 3 shows a design of generating a secondary synchronization signal for a cell for slot 0. Two cyclic shifts of an M-sequence $s_0(n)$ and $s_1(n)$ may be generated based on the $G_{ID}$ of the cell ID of the cell and may be interleaved. Two scrambling sequences $c_0(n)$ and $c_1(n)$ may be generated based on the NED of the cell ID and interleaved. A scrambling sequence $z_0(n)$ may be generated based on the $G_{ID}$ of the cell ID and interleaved with a sequence of all ones. An SSC sequence $d_{ssc}(n)$ may be generated by multiplying the interleaved sequences $s_0(n)$ and $s_1(n)$, the interleaved scrambling sequences $c_0(n)$ and $c_1(n)$, and the interleaved scrambling sequence $z_0(n)$ on a symbol-by-symbol basis.

To generate an OFDM symbol for the secondary synchronization signal, the 62 symbols for the SSC sequence may be mapped to 62 subcarriers with indices $k_0$ through $k_{61}$ used for transmitting the secondary synchronization signal. Zero symbols with signal values of zero and/or other symbols may be mapped to the remaining subcarriers not used for the secondary synchronization signal. K total symbols for the K total subcarriers may be transformed with a K-point inverse fast Fourier transform (IFFT) to obtain a useful portion containing K time-domain samples. The last C samples of the useful portion may be copied and appended to the front of the useful portion to form an OFDM symbol containing K+C samples. The copied portion is commonly referred to as a cyclic prefix and is used to combat inter-symbol interference (ISI) caused by frequency selective fading. C is the cyclic prefix length and may be selected based on the expected delay spread in the system. LTE supports a normal cyclic prefix with a nominal value of C and an extended cyclic prefix with a larger value of C. A slot may include seven symbol periods for the normal cyclic prefix or six symbol periods for the extended cyclic prefix. The OFDM symbol containing the secondary synchronization signal may be sent in one symbol period of a slot.

A UE may search for cells based on the primary and secondary synchronization signals transmitted by these cells. For cell search, the UE may first detect for primary synchronization signals from the cells. The UE may obtain the $N_{ID}$ and symbol timing for each cell with a detected primary synchronization signal. The UE may then detect for the secondary synchronization signal from each detected cell. The UE may obtain the $G_{ID}$ and flame timing for each cell with a detected secondary synchronization signal.

The UE may operate in a connected mode and may communicate with a serving cell. This serving cell may be a cell with the best or good received signal quality at the UE. While in the connected mode, the UE may track the timing of the serving cell with a time tracking loop (TTL). This time tracking loop may periodically estimate the timing of a signal (e.g., the primary and/or secondary synchronization signal) received from the serving cell and may update the timing of the serving cell based on the estimated timing of the received signal. The UE may obtain a stream of received samples. The timing from the time tracking loop may be used to place an FFT window that selects which K received samples to use in each symbol period.

The time tracking loop may update the timing of the serving cell in accordance with a loop filter that provides averaging of potentially noisy timing estimates from the received signal. The time tracking loop may thus be unable to react to fast changes in the timing of the serving cell.

In an aspect, the UE may perform timing searches for the serving cell based on the secondary synchronization signal, which may be generated based on both the $G_{ID}$ and $N_{ID}$ of the cell ID and may thus be unique to the serving cell. The UE may have knowledge of the $G_{ID}$ and $N_{ID}$ of the serving cell and can then locally generate the secondary synchronization signal. The UE may correlate the received samples with the locally generated secondary synchronization signal in the time domain at different time offsets in order to detect for peaks of sufficient strength. The UE may then determine the timing of the serving cell based on the detected peaks.

Figure 4:
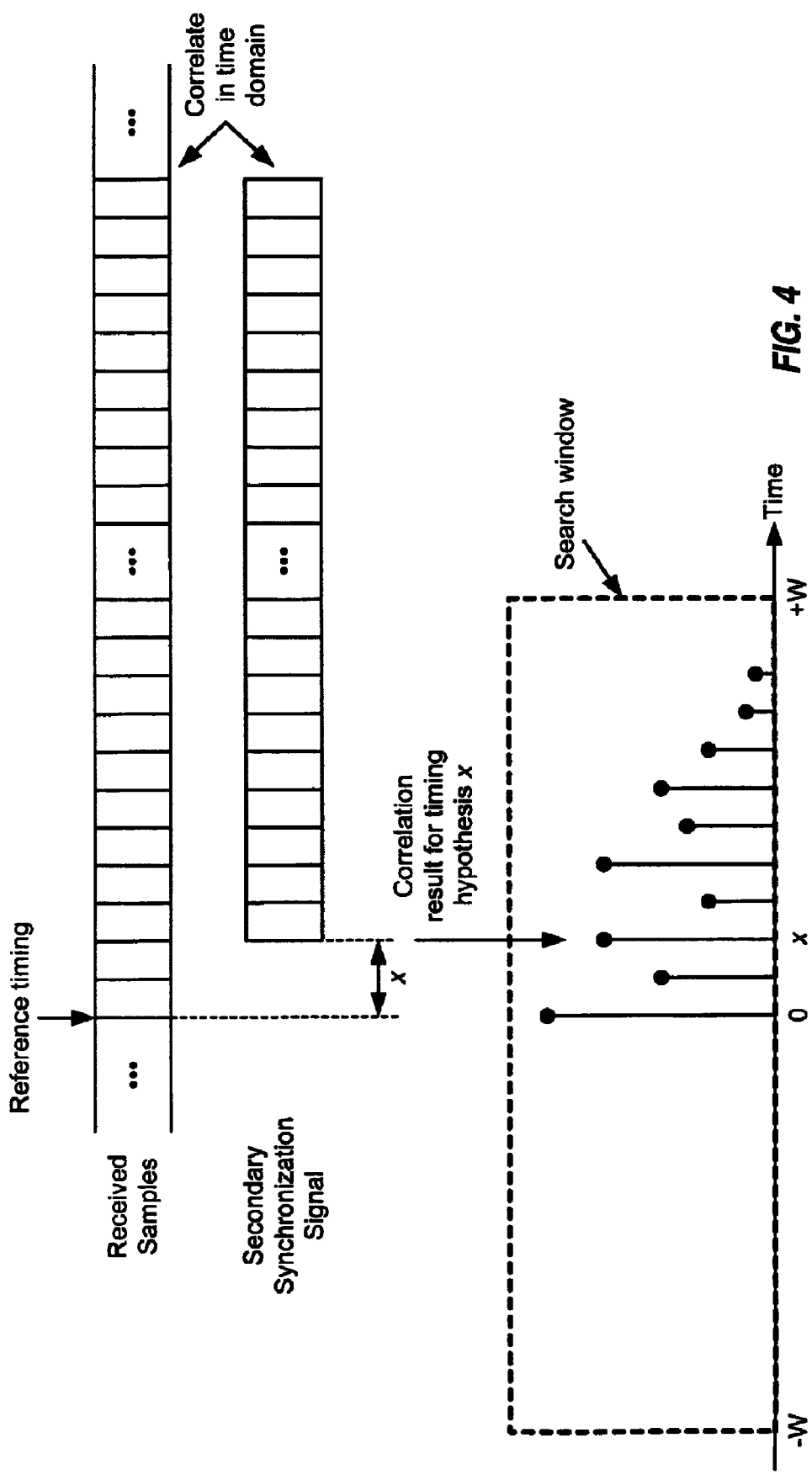
FIG. 4 shows correlation with the secondary synchronization signal.

FIG. 4 shows a design of correlation with the secondary synchronization signal for a timing search. Time-domain received samples at the UE are shown at the top of FIG. 4. A locally generated secondary synchronization signal is shown below the received samples at a time offset of x from reference timing. Correlation may be performed for a set of timing hypotheses, with each timing hypothesis corresponding to different potential timing for the serving cell. Each timing hypothesis may be given by a different time offset from the reference timing, as shown in FIG. 4 and assumed in the description below. The timing hypotheses may also be given by absolute time.

The received samples may be correlated with the locally generated secondary synchronization signal, as follows:

$$E(x) = \sum_i |r(i+x) \cdot s^*(i)|^2 \qquad \text{Eq (4)}$$

where
- r(i) denotes the received samples, with i being a sample index in the time domain,
- s(i) denotes the locally generated secondary synchronization signal,
- E(x) denotes the energy for timing hypothesis x, and
- "*" denotes a complex conjugate.

The received samples may be correlated with the locally generated secondary synchronization signal for different timing hypotheses within a search window. This search window may cover a range from −W sample periods to the left of the reference timing to +W sample periods to the right of the reference timing. In one design, the search window may cover a range from −½ cyclic prefix length to +½ cyclic prefix length. The timing hypotheses may be spaced apart by one sample period or by some other amount. The energy obtained for each timing hypothesis may be indicative of the energy of the received signal for one or more signal paths with a propagation delay corresponding to that timing hypothesis. The energies for different timing hypotheses may be plotted against time, as shown at the bottom of FIG. 4. The leftmost energy may be for the first arriving path (FAP), which may correspond to a line-of-sight path from the serving cell to the UE.

In another design, the received samples may be correlated with a primary synchronization signal to obtain energies for different timing hypotheses. The primary synchronization signal may not uniquely identify the serving cell, as described above. In this case, the energies for timing hypotheses of interest may be verified by detecting the secondary synchronization signal. In yet another design, the received samples may be correlated with both the primary and secondary synchronization signals to obtain energies for different timing hypotheses. Additional energy may be obtained by correlating with both synchronization signals. In general, correlation may be performed with one or more synchronization signals generated based on the cell ID and uniquely identifying a cell whose timing is being determined.

In one design, the energies for different timing hypotheses may be used directly as signal strengths of peaks. Each peak may be formed by one or more signal paths with a particular propagation delay. Each peak may be defined by (i) a signal strength determined by the energy of the signal path(s) forming that peak and (ii) a timing corresponding to the propagation delay of the signal path(s) forming the peak. In this design, the energy for each timing hypothesis obtained from the correlation may be used directly as the signal strength of a peak for that timing hypothesis.

In another design, the energies for different timing hypotheses may be accumulated over an accumulation window of size U. The accumulation window may be placed at different starting positions corresponding to different timing hypotheses. The energies within the accumulation window may be accumulated for each starting position to obtain windowed energy for the corresponding timing hypothesis. The windowed energies may be referred to as accumulated energies and may be used as signal strengths of peaks.

Figure 5:
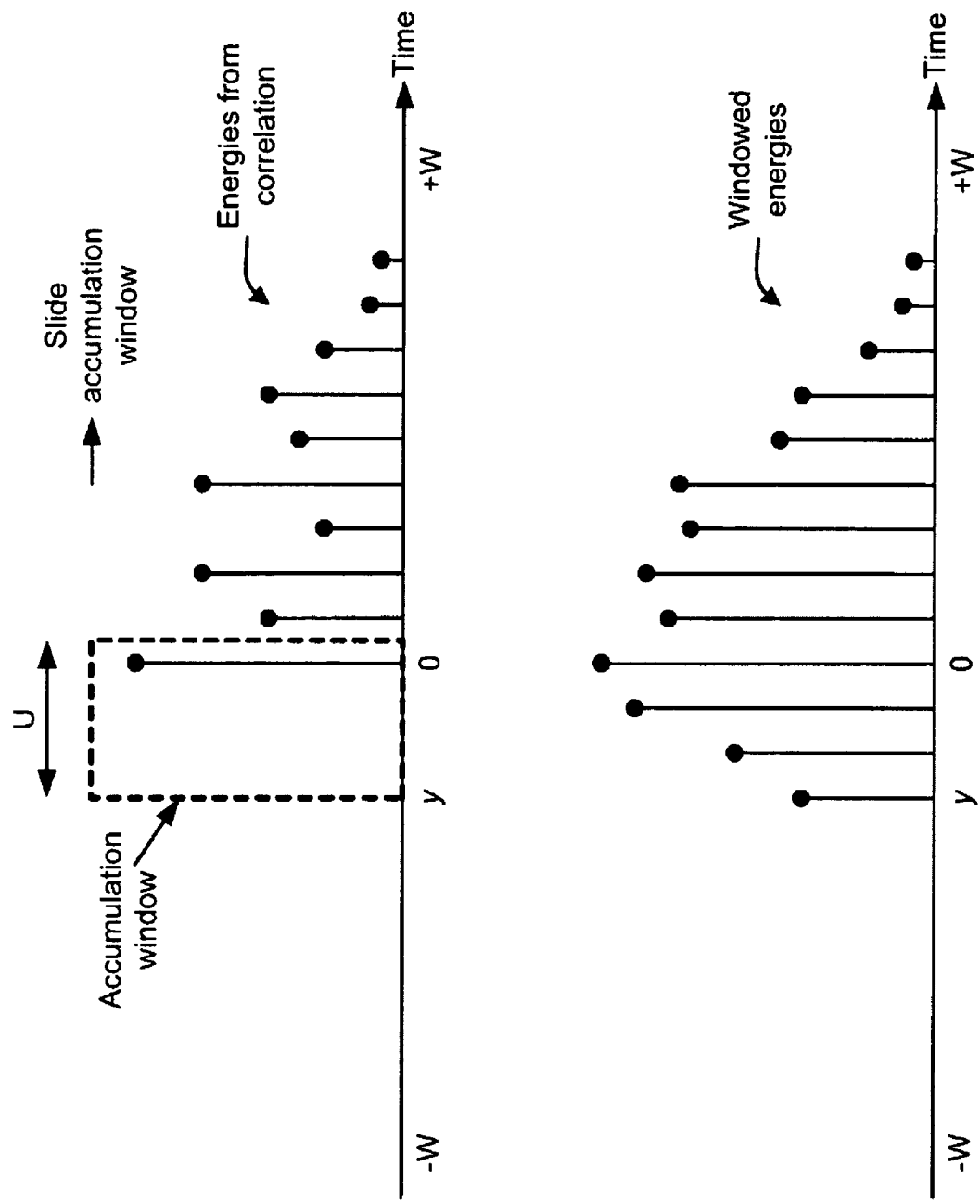
FIG. 5 shows accumulation of energies to obtain windowed energies.

FIG. 5 shows accumulation of energies for different timing hypotheses to obtain windowed energies. A set of energies may be obtained for a range of timing hypotheses from correlation, as described above for FIG. 4. An accumulation window of size U may be placed starting at a time offset of y from the reference timing. The energies within the accumulation window may be accumulated to obtain a windowed energy for timing hypothesis y.

The accumulation window may be slid across a range of time offsets, e.g., from −W to +W sample periods. The windowed energy may be computed for each time offset and may be indicative of the total energy of the received signal for all signal paths with propagation delays falling within the accumulation window. The windowed energies for different timing hypotheses may be plotted against time, as shown at the bottom of FIG. 5.

The energy accumulation may be performed in various manners. In one design, all energies within the accumulation window may be accumulated to obtain the windowed energy. In another design, only energies exceeding a selection threshold $S_{SEL}$ may be accumulated to obtain the windowed energy. The selection threshold may be set such that only energies of signal paths with sufficient strength are accumulated. In yet another design, a predetermined number of largest energies within the accumulation window may be accumulated. The energy accumulation may also be performed in other manners.

The UE may obtain a set of signal strengths for a set of peaks for different timing hypotheses from the correlation and the energy accumulation (if performed). The signal strength of each peak may be equal to (i) the energy for a corresponding timing hypothesis, as shown in FIG. 4, or (ii) the windowed energy for an accumulation window placed at that timing hypothesis, as shown in FIG. 5. The UE may also accumulate the energy or the windowed energy for each timing hypothesis across $N_{ACC}$ timing searches to obtain the signal strength of the peak for that timing hypothesis, where $N_{ACC}$ may be one or greater.

In one design, the UE may compare the signal strength of each peak against a detection threshold. The UE may retain each peak with signal strength exceeding the detection threshold and may discard remaining peaks. In another design, the UE may retain a predetermined number of strong peaks with the highest signal strengths and may discard the remaining peaks. For both designs, the retained peaks may be referred to as detected peaks. The UE may obtain L detected peaks with signal strengths of $S_1$ through $S_L$ for timing hypotheses of $T_1$ through $T_L$, respectively, where L may be one or greater. Signal strength $S_l$ for the l-th detected peak, where l=1, ..., L, may be equal to the energy for timing hypothesis $T_l$ (as shown in FIG. 4) or the windowed energy for timing hypothesis $T_l$ (as shown in FIG. 5). The L detected peaks may be ordered by their signal strengths such that $S_1 \geq S_2 \geq \ldots \geq S_L$.

The UE may periodically perform timing searches (e.g., once every $T_{SEARCH}$ seconds) and may obtain a set of detected peaks from each timing search. The UE may filter the search results from different timing searches in order to improve measurement accuracy. The UE may perform filtering in various manners.

In one design, the UE may maintain a candidate set containing peaks that have been detected previously by the UE. The peaks in the candidate set may be referred to as candidate peaks. Each candidate peak may correspond to a different potential timing for the serving cell. The candidate set may be initialized with the detected peaks from the first timing search, and the signal strength and timing of each detected peak may be recorded. The signal strength and timing of the candidate peaks may thereafter be updated with the signal strength and timing of detected peaks. Strong detected peaks may also be added to the candidate set, and weak candidate peaks may be removed from the candidate set.

At the start of a given timing search, the candidate set may contain M candidate peaks, where M may be one or greater. Each candidate peak may be associated with a particular signal strength and a particular timing. The UE may perform the timing search and obtain L detected peaks with signal strengths of $S_1$ through $S_L$ and timing of $T_1$ through $T_L$. The UE may associate or match the L detected peaks from the timing search with the M candidate peaks in the candidate set. In one design, a detected peak may be associated with a candidate peak if the timing difference between the two peaks is less than a predetermined time distance $\Delta T$. The signal strength and timing of the candidate peak may be filtered with the signal strength and timing of the associated detected peak to obtain updated signal strength and timing for the candidate peak.

In one design, the timing of a candidate peak and the timing of an associated detected peak may be filtered based on an infinite impulse response (IIR) filter, as follows:

$$T_{avg,m}(v) = \alpha_T \cdot T_{avg,m}(v-1) + (1-\alpha_T) \cdot T_l(v), \quad \text{Eq (5)}$$

where $T_{avg,m}(v)$ is the timing of the m-th candidate peak after the v-th timing search, $T_l(v)$ is the timing of the l-th detected peak associated with the m-th candidate peak, and $\alpha_T$ is a coefficient that determines the amount of filtering.

In one design, the signal strength of a candidate peak and the signal strength of an associated detected peak may be filtered based on an IIR filter, as follows:

$$S_{avg,m}(v) = \alpha_S \cdot S_{avg,m}(v-1) + (1-\alpha_S) \cdot S_l(v), \quad \text{Eq (6)}$$

where $S_{avg,m}(v)$ is the signal strength of the m-th candidate peak, $S_l(v)$ is the signal strength of the l-th detected peak, and $\alpha_S$ is a coefficient that determines the amount of filtering.

In equations (5) and (6), larger values of $\alpha_S$ and $\alpha_T$ correspond to more filtering, and vice versa. $\alpha_S$ may or may not be equal to $\alpha_T$, depending on the desired amount of average for signal strength and timing. The filtering may also be performed based on a finite impulse response (FIR) filter or some other type of filter.

A detected peak may be within $\Delta T$ of multiple candidate peaks. In this case, the detected peak may be associated with the closest candidate peak, or the strongest peak among all candidate peaks within $\Delta T$ of the detected peak, or some other candidate peak. A detected peak may not be within $\Delta T$ of any candidate peak. In this case, the detected peak may be added to the candidate set.

A candidate peak may be removed from the candidate set if one or more criteria are met. In one design, a candidate peak may be removed if its signal strength is below a drop threshold for a predetermined amount of time (e.g., $T_{DROP}$ seconds). A timer may be maintained for a candidate peak with signal strength below the drop threshold. The timer may be started when the signal strength falls below the drop threshold. The candidate peak may be removed from the candidate set when the timer expires, which may indicate that the signal strength of the peak has been below the drop threshold for $T_{DROP}$ seconds. A candidate peak may also be removed based on other criteria.

Figure 6:
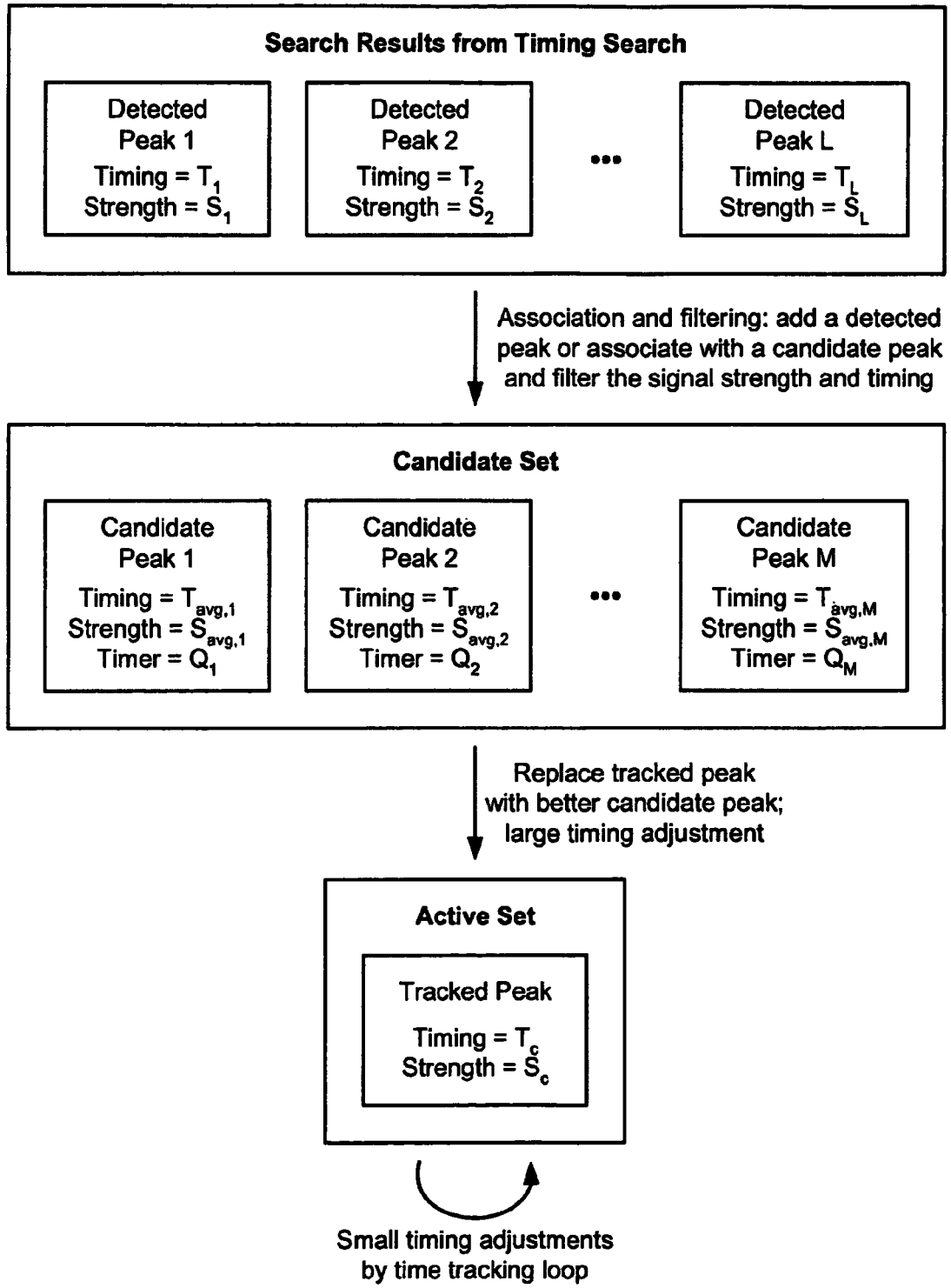
FIG. 6 shows processing to determine and update the timing of a cell.

FIG. 6 shows a design of processing to determine and update the timing of the serving cell. The UE may perform a timing search and may obtain new search results comprising L detected peaks with signal strengths of $S_1$ through $S_L$ and timing of $T_1$ through $T_L$, respectively. The L detected peaks may be sorted from strongest to weakest.

The UE may associate the L detected peaks from the timing search with the M candidate peaks in the candidate set. The UE may filter the signal strength and timing of each candidate peak with the signal strength and timing of an associated detected peak, if any, e.g., as shown in equations (5) and (6). The UE may add a detected peak to the candidate set if no candidate peaks are within $\Delta T$ of the detected peak. The UE may also update the timer for each candidate peak with signal strength below the drop threshold. After completing the updating, the UE may obtain M candidate peaks with signal strengths of $S_{avg,1}$ through $S_{avg,M}$, timing of $T_{avg,1}$ through $T_{avg,M}$, and timer values of $Q_1$ through $Q_M$. The timer value for each candidate peak may convey the amount of time that the signal strength for that peak has been below the drop threshold. The UE may delete a candidate peak when the timer for that peak expires.

The time tracking loop may continually track the timing of a peak in an active set, which may be referred to as a tracked peak. Initially, the strongest peak in the candidate set may be selected as the tracked peak and may be placed in the active set. The tracked peak may or may not be included in the candidate set. Whenever the tracked peak is replaced by a candidate peak, the timing of this candidate peak may be used as the reference timing for the timing searches. The search window for the timing searches may be placed based on the reference timing, e.g., as shown in FIG. 4. The time tracking loop may update the timing of the tracked peak by a small timing adjustment in each update period. The small timing adjustment may be restricted to be within a range of values, e.g., within $-T_{NOM}$ to $+T_{NOM}$ of the current timing of the tracked peak.

The candidate set may be updated after each timing search (or every $N_C$ timing searches) based on the search results. The tracked peak may then be updated based on the candidate peaks. In one design, if a candidate peak corresponding to the tracked peak has higher signal strength than that of the tracked peak, then the tracked peak may be replaced by this candidate peak. The candidate peak corresponding to the tracked peak may be the candidate peak closest to the tracked peak, the candidate peak within a predetermined timing distance of the tracked peak, etc. In another design, if the signal strength of the strongest candidate peak is higher than the signal strength of the tracked peak (e.g., by a predetermined amount $S_{REPLACE}$), then the tracked peak may be replaced by the strongest candidate peak. For both designs, the tracked peak may be replaced whenever a better candidate peak is available or may be replaced only if the signal strength of the tracked peak is below a replacement threshold. The tracked peak may also be replaced by a candidate peak in other manners.

The time tracking loop may update the timing of the tracked peak by a large timing adjustment when the tracked peak is replaced by a selected candidate peak. The large timing adjustment may be outside the range of $-T_{NOM}$ to $+T_{NOM}$. The timing of the selected candidate peak may be used as the new reference timing for the search window, which may be placed at the new reference timing. The timing of other candidate peaks may also be updated based on the timing of the selected candidate peak. For example, if the prior reference timing is $T_{REF1}$ and the timing of the selected candidate peak is $T_{avg,s}$, then the new reference timing may be given as $T_{REF2} = T_{REF1} + T_{avg,s}$, and the timing of each remaining candidate peak may be updated as $T_{avg,m} = T_{avg,m} - T_{avg,s}$.

Table 1 lists various parameters that may be used to perform timing searches and to update cell timing. Each parameter in Table 1 may have a fixed or configurable value, which may be selected to provide good performance. For example, the search period may be a configurable value between 10 to 20 ms or some other value.

TABLE 1

| Parameter | Symbol | Description |
|---|---|---|
| Search period | $T_{SEARCH}$ | Amount of time between timing searches. |
| Combining interval | $N_C$ | Number of timing searches over which to combine energy before updating the candidate set. |

TABLE 1-continued

| Parameter | Symbol | Description |
| --- | --- | --- |
| Accumulation window length | U | Length of accumulation window over which energies are accumulated to obtain the windowed energy. |
| Selection threshold | $S_{SEL}$ | Threshold to determine which energies to accumulate to obtain the windowed energy. |
| Detection threshold | $S_{DET}$ | Threshold to identify detected peaks from a timing search. |
| Association threshold | $\Delta T$ | Timing distance used to associate a detected peak with a candidate peak. |
| Coefficient for signal strength | $\alpha_S$ | Determine amount of averaging for the signal strength of a candidate peak. |
| Coefficient for timing | $\alpha_T$ | Determine amount of averaging for the timing of a candidate peak. |
| Replacement threshold | $S_{REPLACE}$ | Threshold for replacing the tracked peak with a candidate peak. |
| Add threshold | $S_{ADD}$ | Threshold for adding a detected peak to the candidate set. |
| Drop threshold | $S_{DROP}$ | Threshold for removing a peak from the candidate set. |
| Drop timer | $T_{DROP}$ | Timer value for removing a peak from the candidate set. |

The techniques described herein may be used to determine the timing of the serving cell whose cell ID is known to the UE. The techniques may also be used to determine the timing of other cells whose cell IDs are known to the UE. The UE may generate one or more synchronization signals for a cell based on the known cell ID. The UE may then perform correlation with the locally generated synchronization signal(s) to determine the timing of the cell. The UE may perform timing searches in the connected mode, the idle mode, etc.

Figure 7:
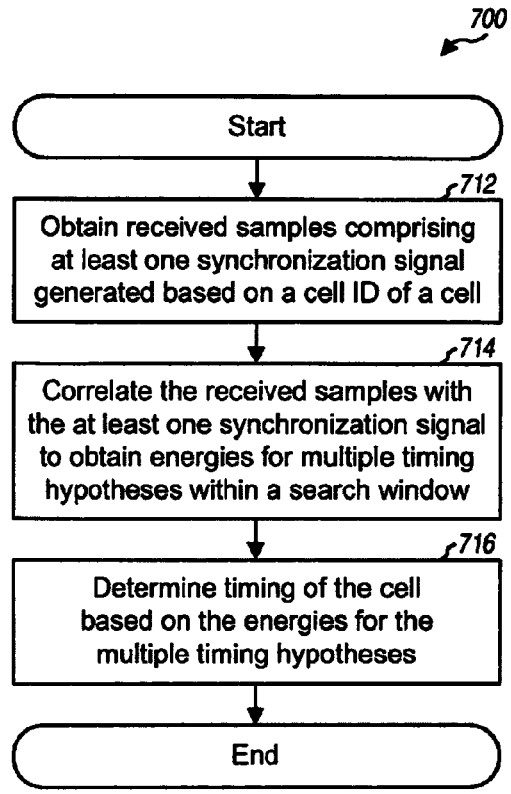
FIGS. 7 and 8 show a process for determining cell timing.

FIG. 7 shows a design of a process 700 for determining cell timing. Process 700 may be performed by a UE (as described below) or by some other entity. The UE may obtain received samples comprising at least one synchronization signal generated based on a cell ID of a cell, e.g., a serving cell (block 712). The UE may correlate the received samples with the at least one synchronization signal to obtain energies for multiple timing hypotheses within a search window (block 714). The UE may then determine the timing of the cell based on the energies for the multiple timing hypotheses (block 716).

The cell ID may comprise a first part $G_{ID}$ for a cell ID group and a second part $N_{ID}$ for an ID within the cell ID group. The at least one synchronization signal may comprise a secondary synchronization signal generated based on the first and second parts of the cell ID. In one design of block 714, the UE may generate the secondary synchronization signal based on the first and second parts of the cell ID. The UE may then correlate the received samples in the time domain with the secondary synchronization signal at different time offsets to obtain the energies for the multiple timing hypotheses. In another design, the at least one synchronization signal may further comprise a primary synchronization signal generated based on the second part of the cell ID. The UE may correlate the received samples in the time domain with the primary and secondary synchronization signals at different time offsets to obtain the energies for the multiple timing hypotheses.

Figure 8:
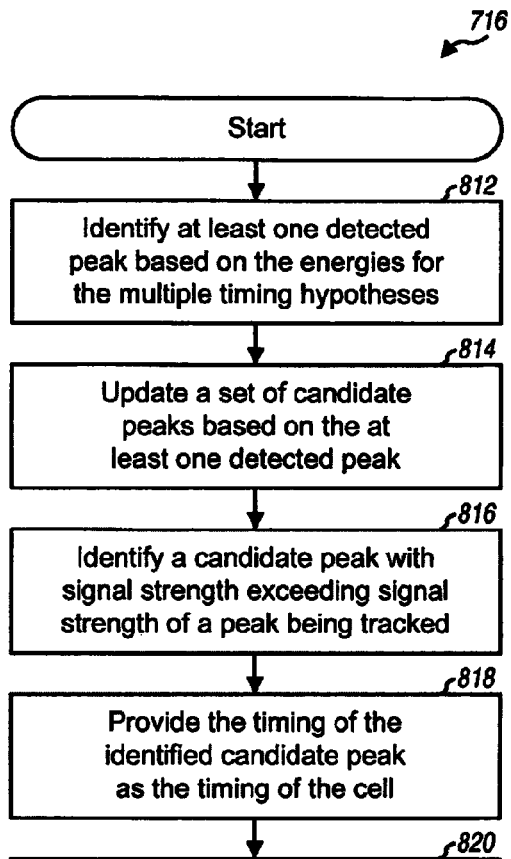

FIG. 8 shows a process for determining the timing of the cell, which is one design of block 716 in FIG. 7. The UE may identify at least one detected peak based on the energies for the multiple timing hypotheses, with each detected peak corresponding to a different timing hypothesis (block 812). In one design, the UE may compare the energy for each timing hypothesis against a detection threshold. The UE may declare a detected peak for each timing hypothesis with energy exceeding the detection threshold. In another design, the UE may accumulate energies within an accumulation window at different time offsets to obtain windowed energies for the multiple timing hypotheses. The UE may compare the windowed energy for each timing hypothesis against a detection threshold. The UE may then declare a detected peak for each timing hypothesis with windowed energy exceeding the detection threshold.

The UE may update a set of candidate peaks based on the at least one detected peak (block 814). In one design, the UE may associate the at least one detected peak with the candidate peaks. A detected peak may be associated with a candidate peak within a predetermined timing distance of the detected peak, if such a candidate peak is present. A detected peak may not be associated with any candidate peak if no candidate peaks are within the predetermined timing distance of the detected peak. The at least one detected peak may also be associated with the candidate peaks in other manners.

In one design, the UE may update the signal strength and timing of each candidate peak based on the signal strength and timing of an associated detected peak, if any. The UE may filter the timing of each candidate peak with the timing of the associated detected peak, e.g., based on a first IIR filter, as shown in equation (5). The UE may filter the signal strength of each candidate peak with the signal strength of an associated detected peak, e.g., based on a second IIR filter, as shown in equation (6).

The UE may add each detected peak not associated with any candidate peak to the set of candidate peaks. The UE may also remove each candidate peak with signal strength below a drop threshold for a predetermined time period from the set of candidate peaks. The UE may initialize the set of candidate peaks with the at least one detected peak if the set is empty.

The UE may identify a candidate peak with signal strength exceeding the signal strength of a peak being tracked (block 816). The UE may provide the timing of the identified candidate peak as the timing of the cell (block 818). The UE may update the timing of the cell with small timing adjustments determined based on a time tracking loop (block 820). The UE may update the timing of the cell with large timing adjustments determined based on the energies for the multiple timing hypotheses obtained from timing searches (block 822). The small timing adjustments may be within a predetermined range of values, and the large timing adjustments may be outside the predetermined range of values. The UE may update the placement of the search window whenever the timing of the cell is updated with a large timing adjustment (block 824).

Figure 9:
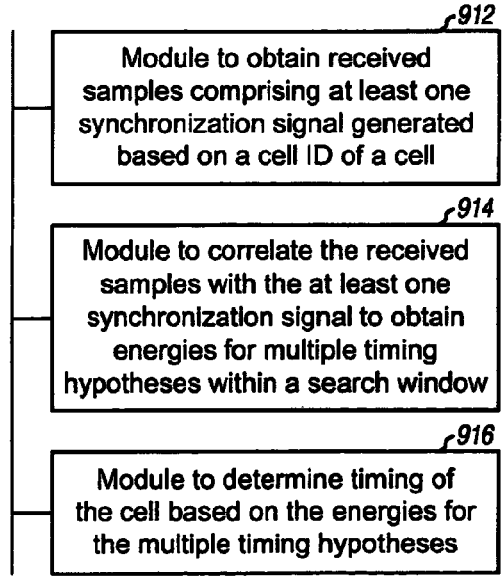
FIG. 9 shows an apparatus for determining cell timing.

FIG. 9 shows a design of an apparatus 900 for determining cell timing. Apparatus 900 includes a module 912 to obtain received samples comprising at least one synchronization signal generated based on a cell ID of a cell, a module 914 to correlate the received samples with the at least one synchronization signal (e.g., in the time domain) to obtain energies for multiple timing hypotheses within a search window, and a module 916 to determine timing of the cell based on the energies for the multiple timing hypotheses. The modules in FIG. 9 may comprise processors, electronics devices, hardware devices, electronics components, logical circuits, memories, etc., or any combination thereof.

Figure 10:
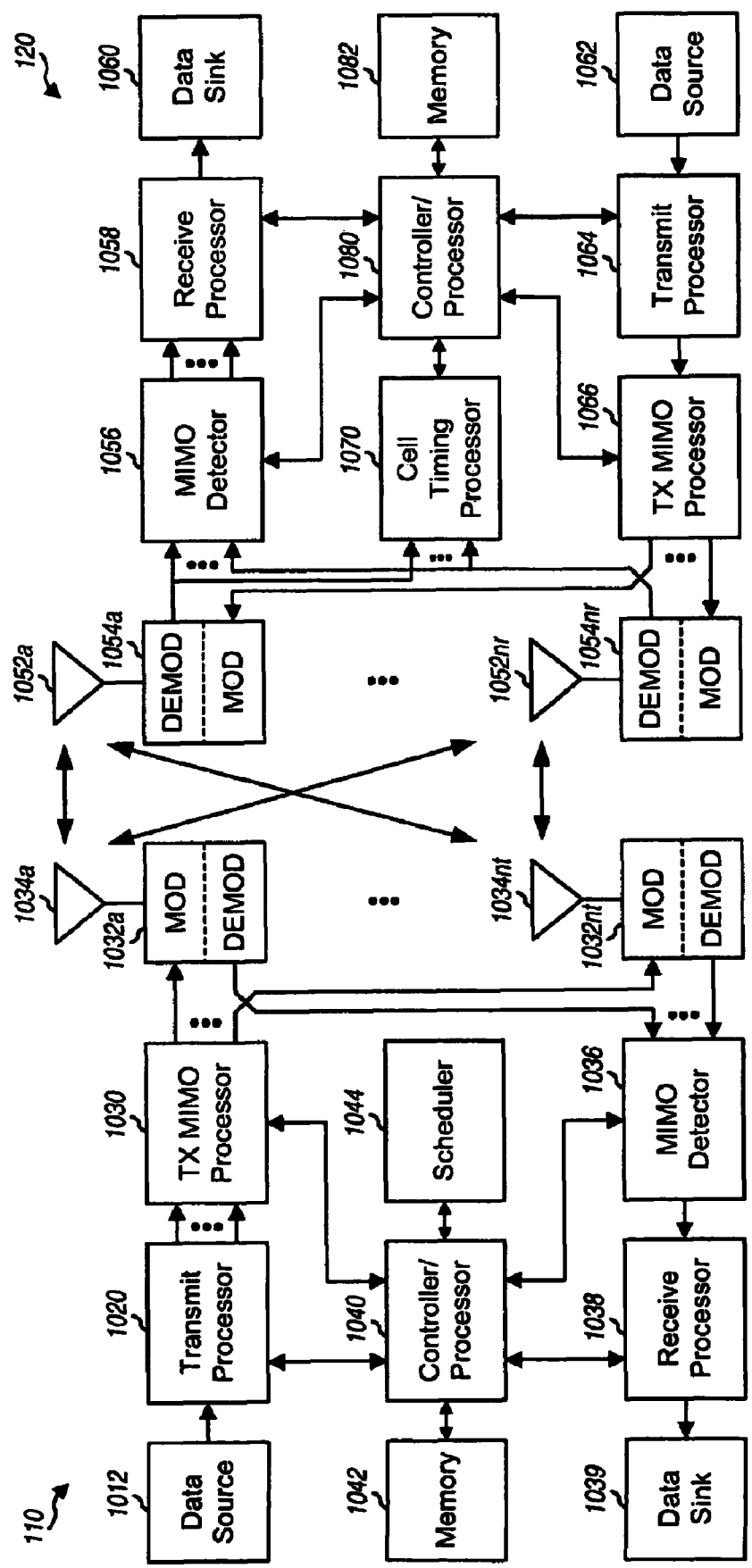
FIG. 10 shows a block diagram of a Node B and a UE.

FIG. 10 shows a block diagram of a design of a Node B 110 and a UE 120, which may be one of the Node Bs and one of the UEs in FIG. 1. In this design, Node B 110 is equipped with $N_T$ antennas 1034a through 1034nt, and UE 120 is equipped with $N_R$ antennas 1052a through 1052nr, where in general $N_T \geq 1$ and $N_R \geq 1$.

At Node B 110, a transmit processor 1020 may receive data for one or more UEs from a data source 1012, process the data for each UE based on one or more modulation and coding schemes selected for that UE, and provide data symbols for all UEs. Transmit processor 1020 may also generate the primary and secondary synchronization signals for each cell and may provide symbols for the synchronization signals for all cells in Node B 110. Transmit processor 1020 may also process signaling/control information and provide signaling symbols. A transmit (TX) multiple-input multiple-output (MIMO) processor 1030 may multiplex the data symbols, the symbols for the synchronization signals, the signaling symbols, and possibly other symbols. TX MIMO processor 1030 may perform spatial processing (e.g., preceding) on the multiplexed symbols, if applicable, and provide $N_T$ output symbol streams to $N_T$ modulators (MODs) 1032a through 1032nt. Each modulator 1032 may process a respective output symbol stream (e.g., for OFDM) to obtain an output sample stream. Each modulator 1032 may further process (e.g., convert to analog, amplify, filter, and upconvert) the output sample stream to obtain a downlink signal. $N_T$ downlink signals from modulators 1032a through 1032nt may be transmitted via $N_T$ antennas 1034a through 1034nt, respectively.

At UE 120, antennas 1052a through 1052nr may receive the downlink signals from Node B 110 and provide received signals to demodulators (DEMODs) 1054a through 1054nr, respectively. Each demodulator 1054 may condition (e.g., filter, amplify, downconvert, and digitize) a respective received signal to obtain received samples. Each demodulator 1054 may further process the received samples (e.g., for OFDM) to obtain received symbols. A MIMO detector 1056 may obtain received symbols from all $N_R$ demodulators 1054a through 1054nr, perform MIMO detection on the received symbols if applicable, and provide detected symbols. A receive processor 1058 may process (e.g., demodulate, deinterleave, and decode) the detected symbols and provide decoded data for UE 120 to a data sink 1060. In general, the processing by MIMO detector 1056 and receive processor 1058 is complementary to the processing by TX MIMO processor 1030 and transmit processor 1020 at Node B 110.

On the uplink, at UE 120, data from a data source 1062 and signaling from a controller/processor 1080 may be processed by a transmit processor 1064, precoded by a TX MIMO processor 1066 if applicable, conditioned by modulators 1054a through 1054nr, and transmitted to Node B 110. At Node B 110, the uplink signals from UE 120 may be received by antennas 1034, conditioned by demodulators 1032, processed by a MIMO detector 1036 if applicable, and further processed by a receive processor 1038 to obtain the data and signaling transmitted by UE 120.

Controllers/processors 1040 and 1080 may direct the operation at Node B 110 and UE 120, respectively. Controller/processor 1080 may perform or direct process 700 in FIG. 7, process 716 in FIG. 8, and/or other processes for the techniques described herein. Memories 1042 and 1082 may store data and program codes for Node B 110 and UE 120, respectively. A scheduler 1044 may schedule UEs for downlink and/or uplink transmission and may provide assignments of resources for the scheduled UEs. A cell timing processor 1070 at UE 120 may perform timing searches, update the candidate set, select a tracked peak, update the timing of a serving cell, etc. Processor 1070 may perform all of part of the processing shown in FIGS. 6 to 8.

Figure 11:
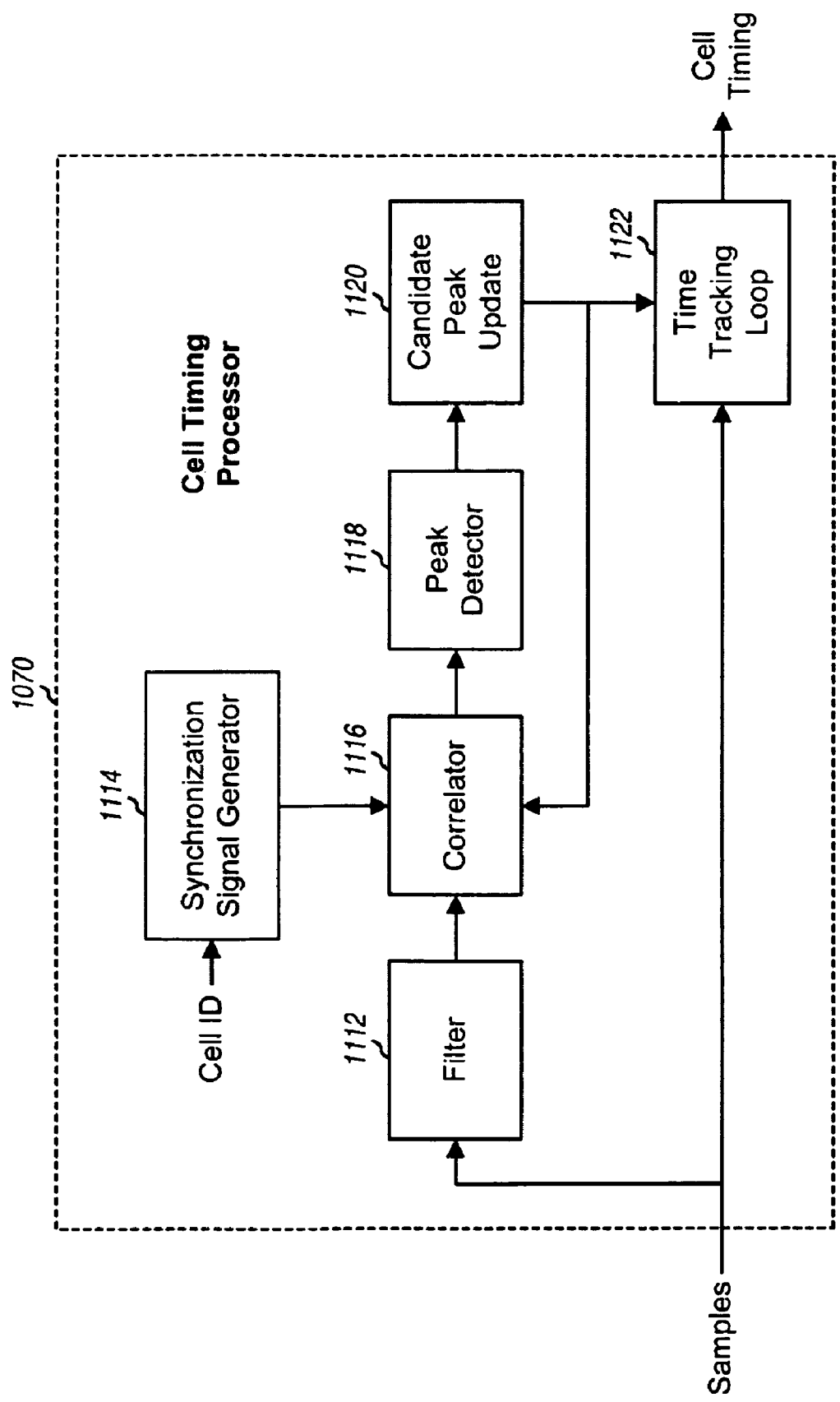
FIG. 11 shows a block diagram of a cell timing processor at the UE.

FIG. 11 shows a block diagram of a design of cell timing processor 1070 at UE 120 in FIG. 10. For simplicity, FIG. 11 shows processing on time-domain samples from one antenna. Within processor 1070, a filter 1112 may obtain time-domain samples at the sample rate and may filter these samples to pass the primary and secondary synchronization signals. Filter 1112 may also decimate the filtered samples from the sample rate to a lower rate. The sample rate may be dependent on the system bandwidth. The lower rate may be dependent on the bandwidth of the synchronization signals and may be 1.92 mega-samples/second (Msps) or some other rate.

A synchronization signal generator 1114 may generate the secondary synchronization signal and possibly the primary synchronization signal based on the cell ID of the serving cell. A correlator 1116 may correlate received samples with the primary and/or secondary synchronization signal and may provide energies for different timing hypotheses within the search window. The received samples may be the samples from filter 1112 (as shown in FIG. 11), the samples provided to processor 1070 (not shown in FIG. 11), or some other samples. A peak detector 1118 may detect for peaks based on the energies for different timing hypotheses and may provide L detected peaks. A unit 1120 may update the set of candidate peaks based on the L detected peaks, as described above. Unit 1120 may also determine whether a candidate peak is better than a peak being tracked by a time tracking loop 1122. If a better candidate peak is available, then unit 1120 may provide this candidate peak to time tracking loop 1122. Unit 1120 may also provide the timing of this candidate peak to correlator 1116, which may place the search window based on the timing of this candidate peak. Time tracking loop 1122 may track the timing of the peak provided by unit 1120 until this peak is replaced with another candidate peak. Time tracking loop 1122 may provide the timing of the serving cell.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
    obtaining received samples comprising at least one synchronization signal generated based on a cell identity (ID) of a cell;
    correlating the received samples with the at least one synchronization signal to obtain energies for multiple timing hypotheses within a search window; and
    determining frame timing of the cell based on the energies for the multiple timing hypotheses,
    wherein the at least one synchronization signal comprises a secondary synchronization signal generated based on first and second parts of the cell ID.

2. The method of claim 1, wherein the cell ID comprises the first part for a cell ID group and the second part for an ID within the cell ID group.

3. The method of claim 2, wherein the correlating the received samples comprises
    generating the secondary synchronization signal based on the first and second parts of the cell ID, and
    correlating the received samples in time domain with the secondary synchronization signal at different time offsets to obtain the energies for the multiple timing hypotheses.

4. The method of claim 2, wherein the at least one synchronization signal further comprises a primary synchronization signal generated based on the second part of the cell ID.

5. The method of claim 4, wherein the correlating the received samples comprises
    generating the primary synchronization signal based on the second part of the cell ID, generating the secondary synchronization signal based on the first and second parts of the cell ID, and
    correlating the received samples in time domain with the primary and secondary synchronization signals at different time offsets to obtain the energies for the multiple timing hypotheses.

6. The method of claim 1, wherein the determining the timing of the cell based on the energies for the multiple timing hypotheses comprises
    identifying at least one detected peak based on the energies for the multiple timing hypotheses, each detected peak corresponding to a different tinting hypothesis, and
    determining the timing of the cell based on the at least one detected peak.

7. The method of claim 6, wherein the identifying the at least one detected peak comprises
    comparing energy for each timing hypothesis against a detection threshold, and
    declaring a detected peak for each timing hypothesis with energy exceeding the detection threshold.

8. The method of claim 6, wherein the identifying the at least one detected peak comprises
    accumulating energies within an accumulation window at different time offsets to obtain windowed energies for the multiple timing hypotheses,
    comparing windowed energy for each timing hypothesis against a detection threshold, and
    declaring a detected peak for each timing hypothesis with windowed energy exceeding the detection threshold.

9. The method of claim 6, wherein the determining the timing of the cell based on the at least one detected peak comprises
    updating a set of candidate peaks based on the at least one detected peak, and
    determining the timing of the cell based on the set of candidate peaks.

10. The method of claim 9, wherein the updating the set of candidate peaks comprises
    associating the at least one detected peak with the candidate peaks, updating signal strength and timing of each candidate peak based on signal strength and timing of an associated detected peak, if any, and adding each detected peak not associated with any candidate peak to the set of candidate peaks.

11. The method of claim 10, wherein the associating the at least one detected peak with the candidate peaks comprises, for each detected peak, associating the detected peak with a candidate peak within a predetermined timing distance of the detected peak if the candidate peak is present, and not associating the detected peak with any candidate peak if no candidate peaks are within the predetermined timing distance of the detected peak.

12. The method of claim 10, wherein the updating the signal strength and timing of each candidate peak comprises filtering the timing of each candidate peak with the timing of an associated detected peak, if any, based on a first filter, and filtering the signal strength of each candidate peak with the signal strength of the associated detected peak, if any, based on a second filter.

13. The method of claim 9, wherein the updating the set of candidate peaks comprises removing each candidate peak with signal strength below a drop threshold for a predetermined time period from the set of candidate peaks.

14. The method of claim 9, wherein the updating the set of candidate peaks comprises initializing the set of candidate peaks with the at least one detected peak if the set is empty.

15. The method of claim 9, wherein the determining the timing of the cell based on the set of candidate peaks comprises identifying a candidate peak with signal strength exceeding signal strength of a peak being tracked, and providing timing of the identified candidate peak as timing of the cell.

16. The method of claim 1, further comprising:

updating the timing of the cell with small timing adjustments determined based on a time tracking loop, the small timing adjustments being within a predetermined range of values; and updating the timing of the cell with large timing adjustments determined based on the energies for the multiple timing hypotheses obtained from timing searches, the large timing adjustments being outside the predetermined range of values.

17. The method of claim 16, further comprising:

updating placement of the search window whenever the timing of the cell is updated with a large timing adjustment.

18. An apparatus for wireless communication, comprising:

at least one processor configured to obtain received samples comprising at least one synchronization signal generated based on a cell identity (ID) of a cell, to correlate the received samples with the at least one synchronization signal to obtain energies for multiple timing hypotheses within a search window, and to determine frame timing of the cell based on the energies for the multiple timing hypotheses, wherein the at least one synchronization signal comprises a secondary synchronization signal generated based on first and second parts of the cell ID; and a memory having instructions stored thereon to instruct the at least one processor.

19. The apparatus of claim 18, wherein the at least one processor is configured to generate the secondary synchronization signal based on the first and second parts of the cell ID, and to correlate the received samples in time domain with the secondary synchronization signal at different time offsets to obtain the energies for the multiple timing hypotheses.

20. The apparatus of claim 18, wherein the at least one processor is configured to identify at least one detected peak based on the energies for the multiple timing hypotheses, each detected peak corresponding to a different timing hypothesis, and to determine the timing of the cell based on the at least one detected peak.

21. The apparatus of claim 20, wherein the at least one processor is configured to update a set of candidate peaks based on the at least one detected peak, and to determine the timing of the cell based on the set of candidate peaks.

22. The apparatus of claim 21, wherein the at least one processor is configured to associate the at least, one detected peak with the candidate peaks, to update signal strength and timing of each candidate peak based on signal strength and timing of an associated detected peak, if any, and to add each detected peak not associated with any candidate peak to the set of candidate peaks.

23. The apparatus of claim 21, wherein the at least one processor is configured to identify a candidate peak with signal strength exceeding signal strength of a peak being tracked, and to provide timing of the identified candidate peak as timing of the cell.

24. The apparatus of claim 18, wherein the at least one processor is configured to update the timing of the cell with small timing adjustments determined based on a time tracking loop, and to update the timing of the cell with large timing adjustments determined based on the energies for the multiple timing hypotheses obtained from timing searches, the small timing adjustments being within a predetermined range of values, and the large timing adjustments being outside the predetermined range of values.

25. An apparatus for wireless communication, comprising:

means for obtaining received samples comprising at least one synchronization signal generated based on a cell identity (ID) of a cell;

means for correlating the received samples with the at least one synchronization signal to obtain energies for multiple timing hypotheses within a search window; and means for determining frame timing of the cell based on the energies for the multiple timing hypotheses, wherein the at least one synchronization signal comprises a secondary synchronization signal generated based on first and second parts of the cell ID.

26. The apparatus of claim 25, wherein the means for correlating the received samples comprises means for generating the secondary synchronization signal based on the first and second parts of the cell ID, and means for correlating the received samples in time domain with the secondary synchronization signal at different time offsets to obtain the energies for the multiple timing hypotheses.

27. The apparatus of claim 25, wherein the means for determining the timing of the cell based on the energies for the multiple timing hypotheses comprises means for identifying at least one detected peak based on the energies for the multiple timing hypotheses, each detected peak corresponding to a different timing hypothesis, and means for determining the timing of the cell based on the at least one detected peak.

28. The apparatus of claim 27, wherein the means for determining the timing of the cell based on the at least one detected peak comprises means for updating a set of candidate peaks based on the at least one detected peak, and means for determining the timing of the cell based on the set of candidate peaks.

29. The apparatus of claim 28, wherein the means for updating the set of candidate peaks comprises means for associating the at least one detected peak with the candidate peaks, means for updating signal strength and timing of each candidate peak based on signal strength and timing of an associated detected peak, if any, and means for adding each detected peak not associated with any candidate peak to the set of candidate peaks.

30. The apparatus of claim 28, wherein the means for determining the timing of the cell based on the set of candidate peaks comprises means for identifying a candidate peak with signal strength exceeding signal strength of a peak being tracked, and means for providing timing of the identified candidate peak as timing of the cell.

31. The apparatus of claim 25, further comprising:

means for updating the timing of the cell with small timing adjustments determined based on a time tracking loop, the small timing adjustments being within a predetermined range of values; and means for updating the timing of the cell with large timing adjustments determined based on the energies for the multiple timing hypotheses obtained from timing searches, the large timing adjustments being outside the predetermined range of values.

32. A computer program product, comprising:

a computer-readable medium comprising:

code for causing at least one computer to obtain received samples comprising at least one synchronization signal generated based on a cell identity (ID) of a cell, code for causing the at least one computer to correlate the received samples with the at least one synchronization signal to obtain energies for multiple timing hypotheses within a search window, and code for causing the at least one computer to determine frame timing of the cell based on the energies for the multiple timing hypotheses, wherein the at least one synchronization signal comprises a secondary synchronization signal generated based on first and second parts of the cell ID.

33. The computer program product of claim 32, the computer-readable medium further comprising:

code for causing the at least one computer to identify at least one detected peak based on the energies for the multiple timing hypotheses, each detected peak corresponding to a different timing hypothesis, code for causing the at least one computer to update a set of candidate peaks based on the at least one detected peak, and code for causing the at least one computer to determine the timing of the cell based on the set of candidate peaks.

34. The computer program product of claim 33, the computer-readable medium further comprising:

code for causing the at least one computer to associate the at least one detected peak with the candidate peaks, code for causing the at least one computer to update signal strength and timing of each candidate peak based on signal strength and timing of an associated detected peak, if any, and code for causing the at-least one computer to add each detected peak not associated with any candidate peak to the set of candidate peaks.

35. The computer program product of claim 32, the computer-readable medium further comprising:

code for causing the at least one computer to update the timing of the cell with small timing adjustments determined based on a time tracking loop, the small timing adjustments being within a predetermined range of values, and code for causing the at least one computer to update the timing of the cell with large timing adjustments determined based on the energies for the multiple timing hypotheses obtained from timing searches, the large timing adjustments being outside the predetermined range of values.

* * * * *